United States Patent
Lee et al.

(10) Patent No.: US 9,259,794 B2
(45) Date of Patent: Feb. 16, 2016

(54) FLUX SPRAY MACHINE

(71) Applicant: DELTA ELECTRONICS POWER (DONG GUAN) CO., LTD., Dongguan, Guangdong (CN)

(72) Inventors: Wenfu Lee, Dongguan (CN); Yushan Lee, Dongguan (CN)

(73) Assignee: DELTA ELECTRONICS POWER(DONG GUAN)CO., LTD., Guangdong (CN)

(*) Notice: Subject to any disclaimer, the term of this patent is extended or adjusted under 35 U.S.C. 154(b) by 172 days.

(21) Appl. No.: 13/845,854

(22) Filed: Mar. 18, 2013

(65) Prior Publication Data

US 2014/0130738 A1 May 15, 2014

(30) Foreign Application Priority Data

Nov. 12, 2012 (CN) .......................... 2012 1 0451016

(51) Int. Cl.
*B23K 3/08* (2006.01)
*B05C 11/00* (2006.01)
*B23K 1/00* (2006.01)

(52) U.S. Cl.
CPC ............... *B23K 3/082* (2013.01); *B23K 1/0016* (2013.01)

(58) Field of Classification Search
None
See application file for complete search history.

(56) References Cited

U.S. PATENT DOCUMENTS

| | | | |
|---|---|---|---|
| 2,370,775 A * | 3/1945 | Capita | 228/10 |
| 2010/0163606 A1 * | 7/2010 | Sato et al. | 228/223 |

FOREIGN PATENT DOCUMENTS

| | | |
|---|---|---|
| CN | 2481113 Y | 3/2002 |
| CN | 201143482 Y | 11/2008 |
| CN | 201435877 Y | 3/2010 |
| CN | 201483120 U | 5/2010 |
| CN | 101990396 A | 3/2011 |
| CN | 102548241 A | 7/2012 |
| CN | 202506925 U | 10/2012 |
| JP | 2006181625 A | 7/2006 |

OTHER PUBLICATIONS

Office Action issued May 20, 2015 by the CN Office.
Office Action issued Jul. 20, 2015 by the TW Office.

* cited by examiner

*Primary Examiner* — Dah-Wei D Yuan
*Assistant Examiner* — Jethro M Pence
(74) *Attorney, Agent, or Firm* — Yunling Ren; Eaton & Van Winkle (57) ABSTRACT

A flux spray machine for spraying flux to printed circuit board assembly (PCBA) is provided, which comprising: a PCBA transfer track to transferring the PCBA for spraying flux, comprising an active beam and a fixed beam; a spray mechanism, a X-Y table of vertical spray mechanism comprising a longitudinal beam, a crossbeam movable on and perpendicular to the longitudinal beam, and a flux nozzle for spraying flux movably provided on the crossbeam; and a flow-controlling mechanism, comprising origin sensors and limit sensors for two different flows in two longitudinal directions of the PCBA transfer track.

4 Claims, 10 Drawing Sheets

FLUX SPRAY MACHINE

CROSS-REFERENCE TO RELATED APPLICATIONS

This application claims benefits of Chinese Patent Application No. 201210451016.5, filed on Nov. 12, 2012 in the State Intellectual Property Office of China, the disclosure of which is incorporated herein by reference in its entirety.

FIELD OF THE INVENTION

The present disclosure relates to a flux spray machine, and to a flux spray machine for spraying soldering flux in a wave soldering process.

DISCUSSION OF RELATED ART

Soldering flux spraying of the flux spray machine is important to a wave soldering process. However, the production flow of the flux spray machine in the related art is consistent with the flow of the insert line. Therefore, prior to the purchase of the flux spray machine, the equipment supplier is required to configure the flow of the flux spray machine according to the pre-determined flow of the insert line, and the configured flow direction is fixed and unchangeable. If the flow of the flux spray machine has to be changed due to equipment relocation or production need, the equipment cannot be used any more, resulting in the re-purchase of new equipment and the waste of the old idle equipment.

Figure 1:
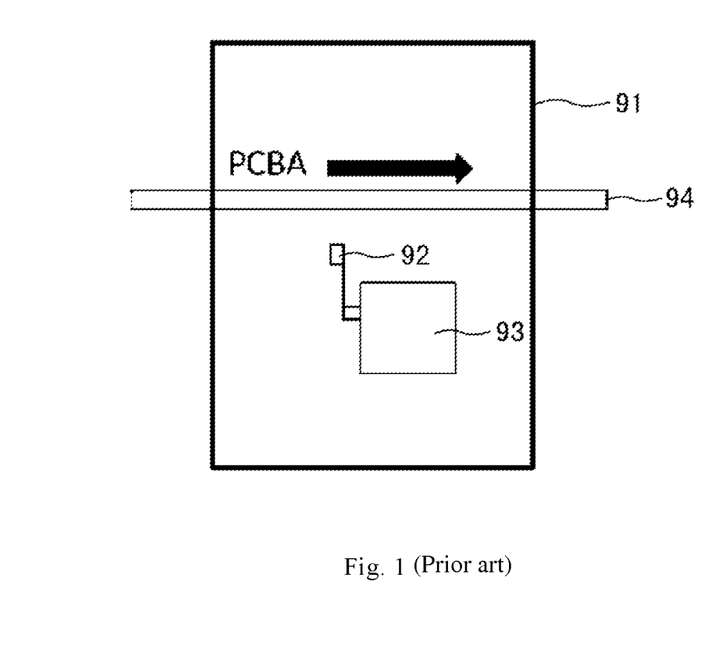
FIG. 1 is a schematic front view of a flux spray machine in the related art.
Figure 2:
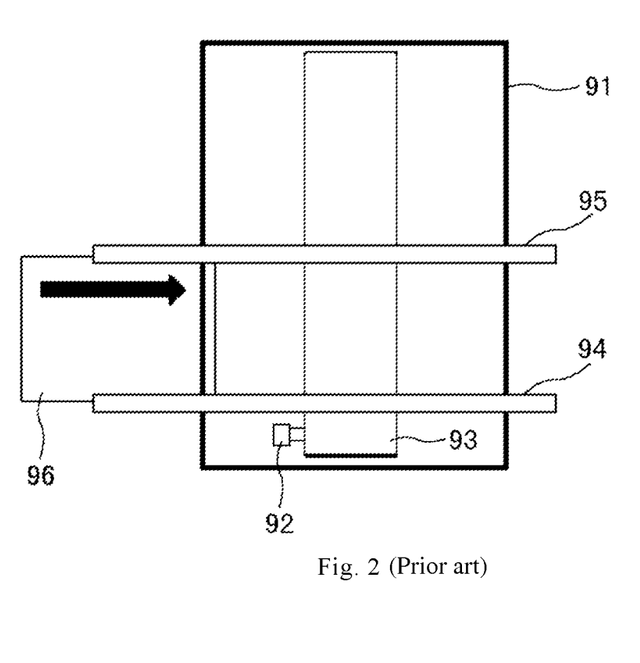
FIG. 2 is a schematic top view of a flux spray machine in the related art.

As shown in FIGS. 1 and 2, in the flux spray machine 91 of the related art, one side of a transfer track for printed circuit board assembly (PCBA) adjacent to the operator is a fixed edge 94, the other side is an active edge 95, and a width of the PCBA transfer track is adjusted by adjusting the active edge 95.

As shown in FIGS. 1 and 2, the PCBA transfer structure for the flux spray machine 91 in the related art has only a one-way flow, i.e., from left to right or from right to left, as indicated by arrows shown in figures. According to such a design, if the equipment relocation or the re-arrangement of the production line causes the flow to change, the flux spray machine can-not be used any more. A set of new equipment meeting the requirement to the new flow has to be purchased, and thus the old idle equipment will be idle and wasted.

Further, in the flux spray machine 91 in the related art, when a flux nozzle 92 of a spray mechanism 93 is performing a flux spray process, an angle difference between the PCBA 96 and the nozzle 92 is in a range of 0 to 7 degrees, thereby resulting in the shadowing effect to through holes of PCBA 96 and affecting spraying quality of the soldering flux spray.

Moreover, the nozzle 92 of the flux spray machine 91 in the related art can only do one-way movement along longitudinal direction of the spray mechanism 93. The movement of the spray mechanism 93 is not flexible enough, and the different equipment uses are not considered and thus the use of the equipment is not flexible.

SUMMARY

The present disclosure provides a flux spray machine supporting two-way flows and having a spray mechanism capable of flexible moving.

The present disclosure further provides a flux spray machine, of which the flux nozzle of the spray mechanism can be adjusted with angle changes of the transfer track, thereby the shadowing effect to the through hole of PCBA resulting from the flux nozzle which is not adjustable with angle changes of the transfer track is overcome.

According to an aspect of the invention, a flux spray machine for spraying flux to printed circuit board assembly (PCBA) is provided, which comprising: a PCBA transfer track to transfer the PCBA configured to have flux applied thereon, comprising an active beam and a fixed beam; a spray mechanism comprising a X-Y table, wherein the X-Y table of the spray mechanism comprises a longitudinal beam and a crossbeam configured to move on the longitudinal beam and perpendicular to the longitudinal beam, and a flux nozzle for spraying flux is disposed on the crossbeam and configured to move on the crossbeam; and a flow-controlling mechanism, comprising origin sensors and limit sensors for two different flows in two longitudinal directions of the PCBA transfer track.

For example, the flow-controlling mechanism comprises a first limit sensor, a first origin sensor, a second origin sensor and a second limit sensor, which are sequentially provided in a first direction at the fixed beam, wherein the first limit sensor and the second origin sensor are used for a first flow along the first direction, and the first origin sensor and the second limit sensor are used for a second flow along a second direction opposite to the first direction.

For example, the flux spray machine further comprises a second longitudinal beams, wherein the crossbeam is provided between the two longitudinal beams, each of which is provided with a linear slide rail, an end portion of the crossbeam is connected with the linear slide rail, and the crossbeam is provided with a linear slide rail for the flux nozzle to move thereon.

For example, the two longitudinal beams are a primary longitudinal beam and a secondary longitudinal beam respectively, the primary longitudinal beam is provided with a first servomotor for driving the crossbeam to move, the crossbeam is provided with a second servomotor for driving the flux nozzle to move.

For example, the flux spray machine further comprises a width-adjusting mechanism for adjusting a distance between the active beam and the fixed beam, the width-adjusting mechanism comprising a top frame disposed over the PCBA transfer track, a driving mechanism provided at a center of the top frame, a connecting component connected between the PCBA transfer track and the driving mechanism, and a third servomotor for driving the driving mechanism to move the active beam close to or away from the fixed beam.

For example, opposite ends of active beam and the fixed beam are connected to a driving shaft and a driven shaft, respectively, and wherein the active beam slides along the driving shaft and the driven shaft while moving close to or away from the fixed beam.

For example, the driving mechanism is a screw nut-and-rod driving mechanism, wherein the connecting component comprises a central connecting component and a sliding component, the central connecting component being connected and fixed below a screw nut of the driving mechanism and being perpendicularly connected to a top surface of the active beam, a bottom end of the sliding component being connected with the top surface of the active beam, a top end of the sliding component being lapped over an inner side of the top frame and being movable along the top frame.

For example, connecting plates are fixed and connected between the top frame and the opposite end portions of the longitudinal beams of the spray mechanism.

For example, the flux spray machine further comprises an angle-adjusting mechanism for adjusting an angle between the PCBA transfer track and a horizontal plane, the angle-adjusting mechanism comprising two pairs of synchronizing lifting columns provided below four corners of the top frame respectively.

For example, connecting plates are fixed and connected between the top frame and the opposite end portions of the longitudinal beams of the spray mechanism, wherein the top frame is fixed and connected to the PCBA transfer track, and wherein the top frame is parallel to a spray plane of the spray mechanism and parallel to a transfer plane of the PCBA transfer track.

For example, the lifting column comprises a wedge-shaped base, a lifting mechanism provided in the wedge-shaped base, a connecting plate connected to an output screw rod of the lifting mechanism, and a driving component for driving the lifting mechanism, wherein an upper end of the connecting plate is hinged to the top frame, wherein two output screw rods of a pair of synchronizing lifting columns are provided with synchronizing gears, and a timing chain is connected between the gears.

For example, an adjusting angle range of the angle-adjusting mechanism is in 0 to 10 degrees.

For example, a fixing component is further fixed and connected between the fixed beam and the top frame.

For example, the top frame is of a rectangle shape formed by a back top beam, a front top beam, a left top beam and a right top beam, two sliding components and two fixing components are connected with the left top beam and the right top beam in left-to-right symmetry.

For example, the driving component is disposed at a side close to the fixed beam and away from the active beam.

DETAILED DESCRIPTION OF PREFERRED EMBODIMENTS

Some exemplary embodiments embodying the features and the advantages of the present disclosure will be illustrated in the following detailed description.

It will be understood that various changes to various embodiments does not depart from the scope of the invention, and thus the description and the figures thereof are essentially used for illustration rather than limitation.

Figure 3:
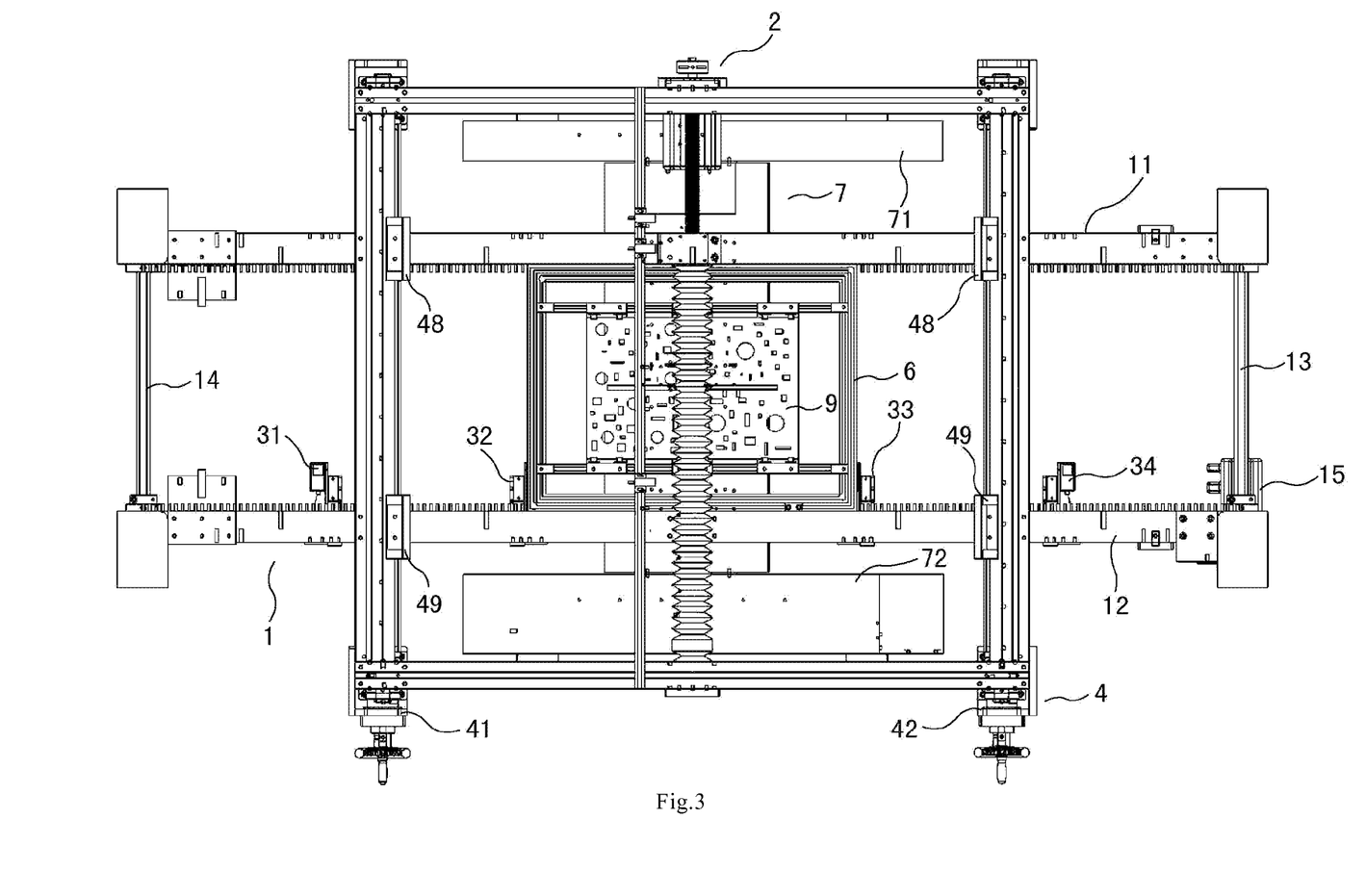
FIG. 3 is a schematic top view of a flux spray machine according to an embodiment of the present disclosure.
Figure 9:
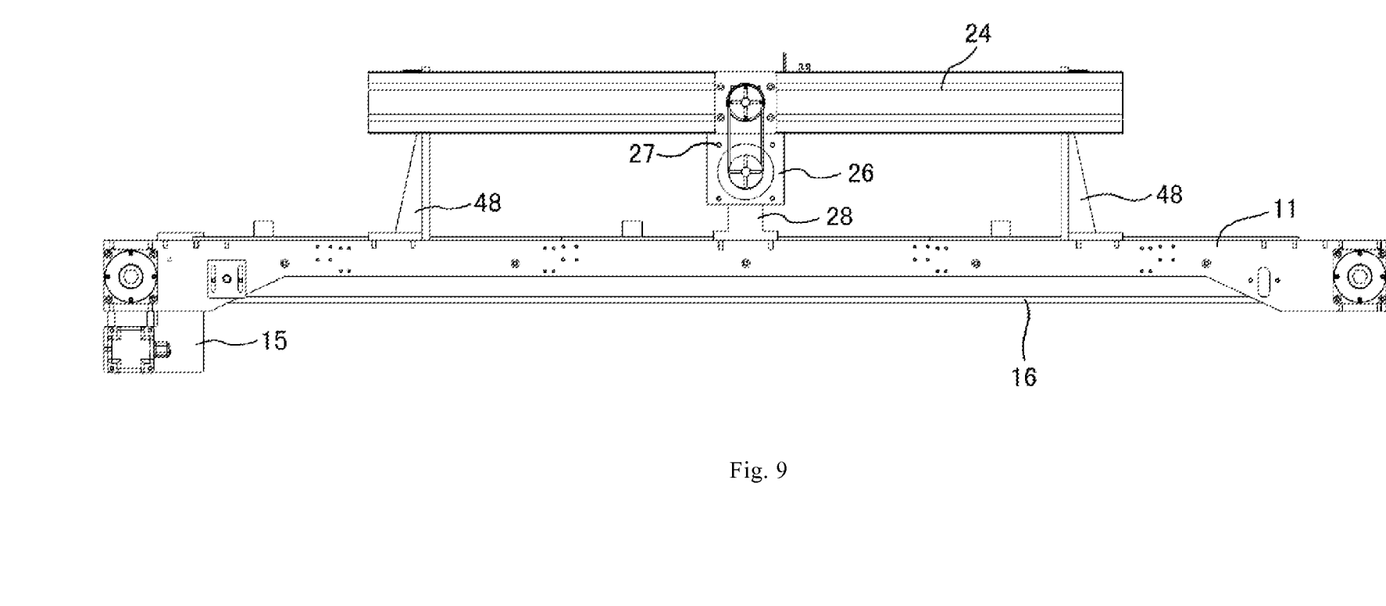
FIG. 9 is a schematic font view of a width-adjusting mechanism of a flux spray machine according to an embodiment of the present disclosure.
Figure 12:
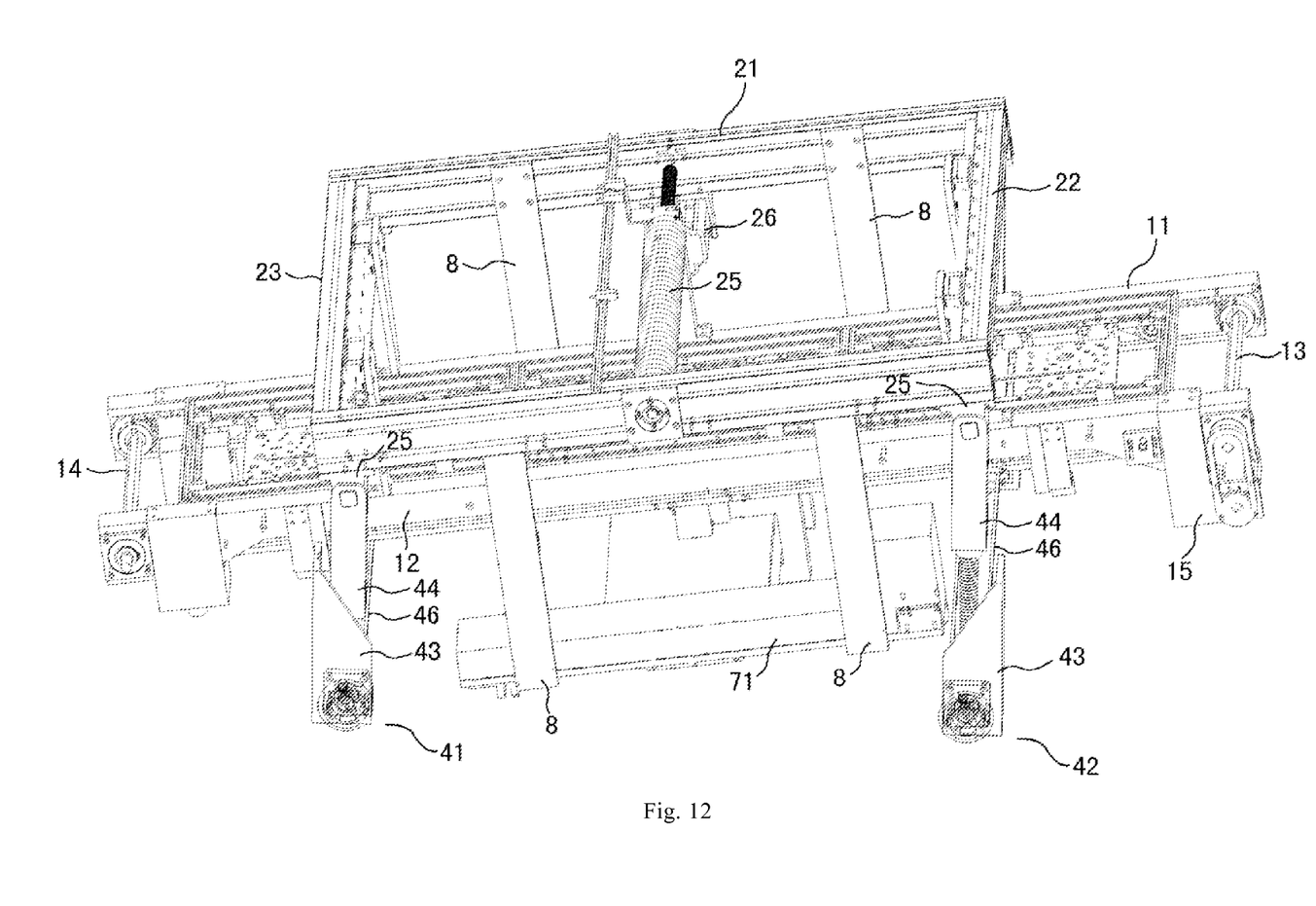
FIG. 12 is a schematic perspective view of a flux spray machine after the track angle is adjusted.

As shown in FIGS. 3, 9 and 12, the flux spray machine of the present embodiment mainly comprises a PCBA transfer track 1, a width-adjusting mechanism 2, a flow-controlling mechanism, an angle-adjusting mechanism 4 and a spray mechanism 7.

The PCBA transfer track 1 is used to transfer PCBA, the flow-controlling mechanism achieves two-way flow control through sensing and positioning of the sensor, the width-adjusting mechanism 2 is used to adjust a width (pitch) of the PCBA transfer track, the angle-adjusting mechanism 4 is used to adjust an angle between the PCBA transfer track 1 and the horizontal plane, and the spray mechanism 7 is an execution unit for the flux spray.

The following description will illustrate various components of the flux spray machine according to an embodiment of the present disclosure.

1. PCBA Transfer Track 1

Figure 7:
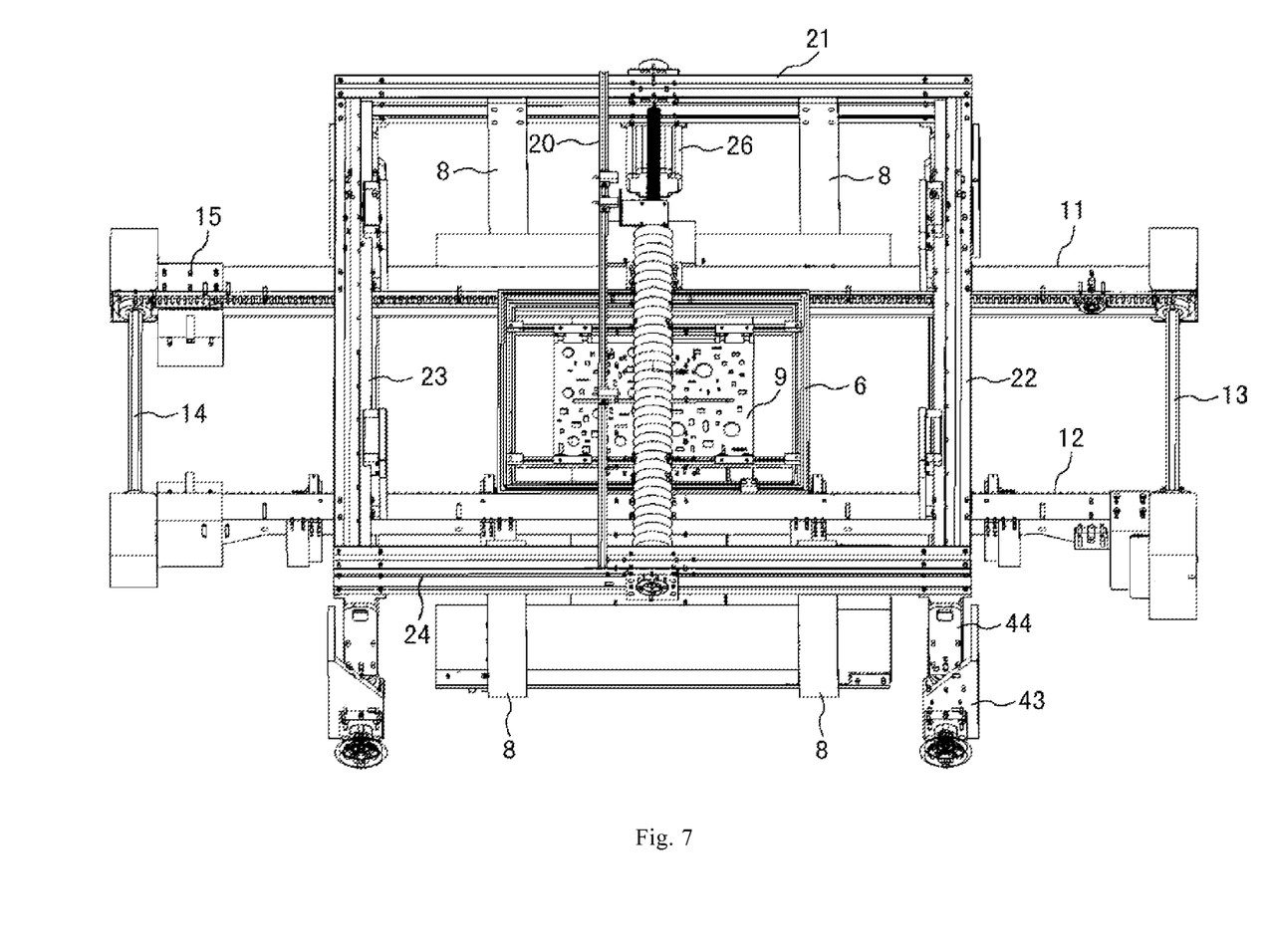
FIG. 7 is a schematic perspective view of a flux spray machine with a spray mechanism according to an embodiment of the present disclosure.

As shown in FIGS. 3 and 7, in the flux spray machine of the present embodiment, the PCBA transfer track 1 comprises an active beam 11 and a fixed beam 12 parallel to each other. A driving shaft 13 is in connection with ends of the active beam 11 and the fixed beam 12, and a driven shaft 14 is in connection with opposite ends of the active beam 11 and the fixed beam 12. For adjusting the width of the PCBA transfer track 1, the active beam 11 slides close to or away from the fixed beam 12 along the driving shaft 13 and the driven shaft 14, thereby changing the pitch of the PCBA transfer track 1. To achieve the transmitting and sliding support functions of the driving shaft 13 and the driven shaft 14, the driving shaft 13 and the driven shaft 14 are spline shafts or provided with key slots.

In operation, the operator stands by the fixed beam 12.

Therefore, the words of before, after, left, right in the present specification is based the observation view of the operator.

As shown in FIGS. 3, 7 and 9, a track transfer motor 15 is provided at the right end portion of the fixed beam 12 to generate a driving force for transferring the PCBA 9. The track transfer motor 15 is connected with a conveyor belt (or conveyor chain) 16 to transfer the PCBA 9. During transferring, the PCBA 9 is supported on a carrying frame 6 through supporting members.

The loading or unloading direction of the PCBA 9 is controlled by the rotation direction of the track transfer motor 15, after the flow direction is set. The transfer speed is automatically adjusted by the track transfer motor 15 according to the set parameters.

2. Spray Mechanism 7

Figure 4:
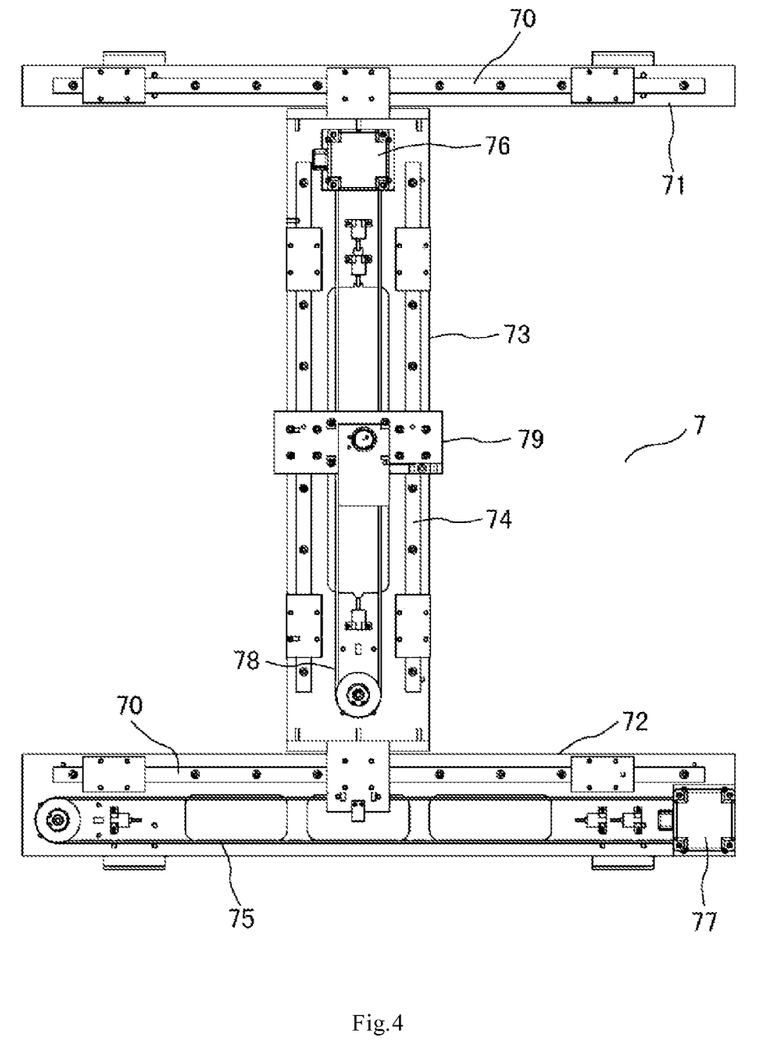
FIG. 4 is a schematic top view of a table spray mechanism according to an embodiment of the present disclosure.
Figure 5:
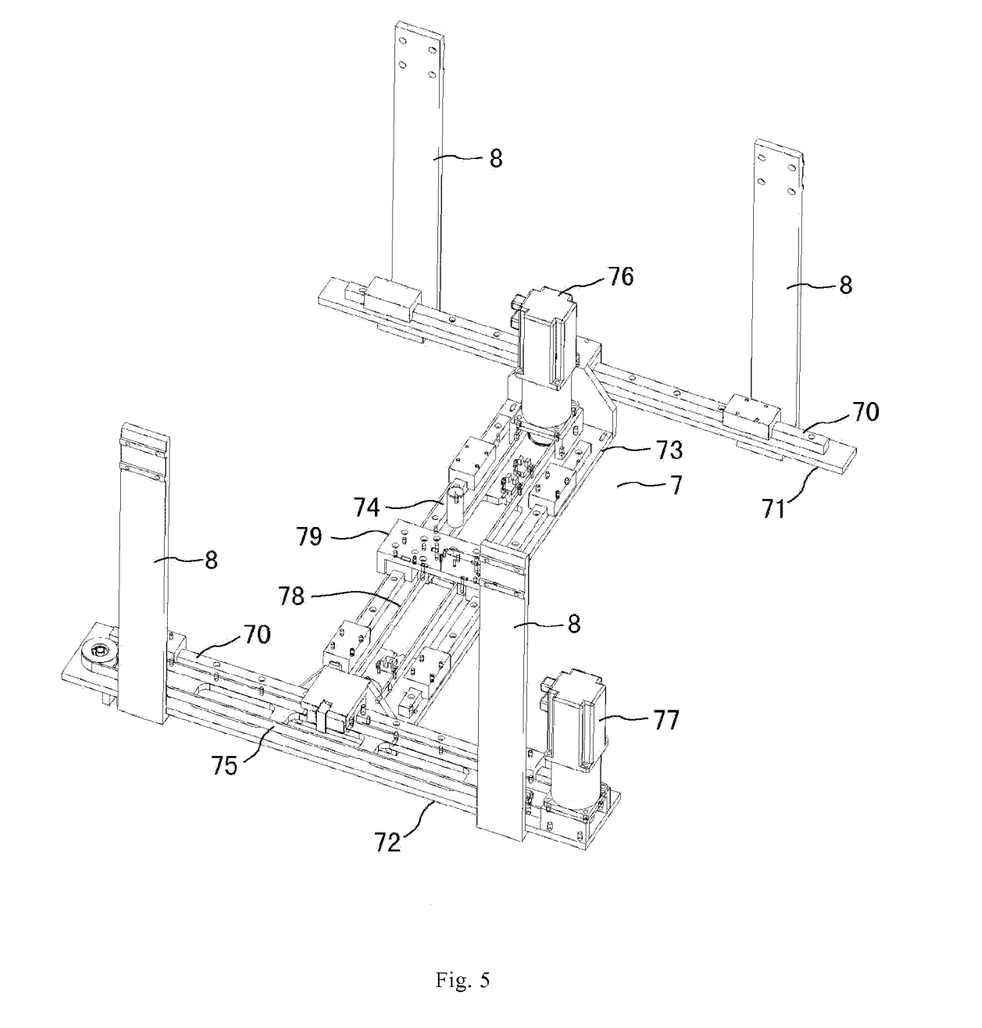
FIG. 5 is a schematic perspective view of a perpendicular spray mechanism according to an embodiment of the present disclosure.

As shown in FIGS. 4 and 5, the spray mechanism 7 is provided below the PCBA transfer track 1.

An X-Y table frame of the spray mechanism 7 comprises a primary longitudinal beam 72, a secondary longitudinal beam 71 and a crossbeam 73. The primary longitudinal beam 72 is parallel to the secondary longitudinal beam 71, and the primary longitudinal beam 72 and the secondary longitudinal beam 71 are perpendicular to the crossbeam 73 and parallel to the active beam 11 and the fixed beam 12. The primary longitudinal beam 72 is relatively close to the fixed beam 12, the secondary longitudinal beam 71 is relatively close to the active beam 11, and the distance between the primary longitudinal beam 72 and the secondary longitudinal beam 71 is larger than that between the active beam 11 and the fixed beam 12.

The primary longitudinal beam 72 and the secondary longitudinal beam 71 are equivalent to the X-axis, and the crossbeam 73 is equivalent to the Y-axis. A servomotor 77 is provided at the X-axis, and a servomotor 76 is provided at the Y-axis. The servomotors 76 and 77 independently control a movement direction and a movement speed of the flux nozzle 79, and a movement location or a movement coordinate is accurately recorded via an encoder.

The primary longitudinal beam 72 and the secondary longitudinal beam 71 are provided with linear slide rails 70 respectively, and two ends of the crossbeam 73 slide along the linear slide rails 70. The force for driving the crossbeam 73 to slide comes from the servomotor 77. One end of the crossbeam 73 close to the primary longitudinal beam 72 is fixed to a driving belt 75 connected with the servomotor 77, thereby obtaining a force for the crossbeam 73 to slide.

The flux nozzle 79 is provided at the crossbeam 73. To be more specific, the flux nozzle 79 is fixed to the driving belt 78 connected with the servomotor 76. The crossbeam 73 is also provided with linear slide rails 74; the flux nozzle 79 is driven by the servomotor 76 and thus slides along the linear slide rails 74.

The movement speed, location and coordinate of the flux nozzle 79 can be controlled, calculated and instructed by a computer program.

As shown in FIG. 7, the spray mechanism 7 is suspended from the width-adjusting mechanism 2. To be more specific, two ends of the primary beam 72 and two ends of the secondary beam 71 are in perpendicular connection with connecting plates 8, top ends of which are in connection with a back top beam 24 and a front top beam 21 of the width-adjusting mechanism 2 respectively.

3. Width-Adjusting Mechanism 2

When the width of the PCBA 9 or the carrying frame 6 for carrying the PCBA 9 is changed or needs to be adjusted, the width-adjusting mechanism 2 automatically adjusts the distance between the active beam 11 and the fixed beam 12 according to the set parameters.

Figure 8:
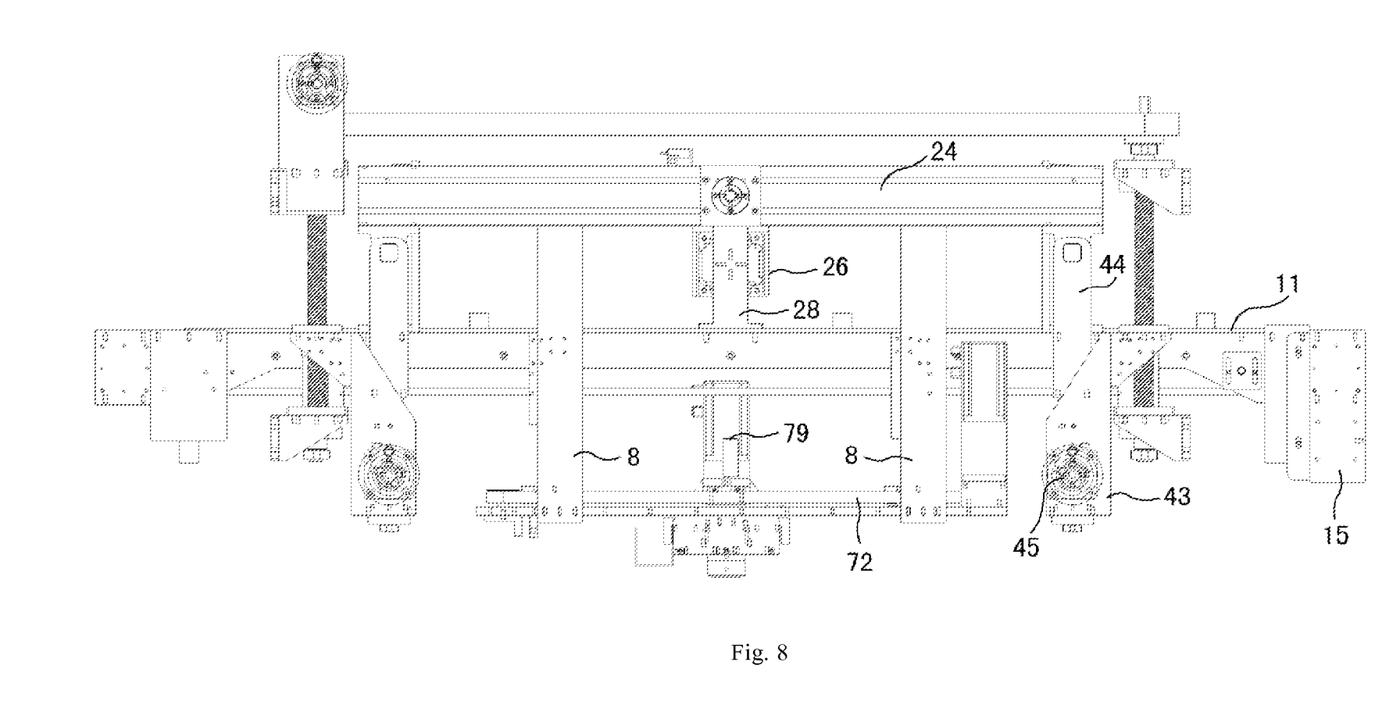
FIG. 8 is a schematic back view of a flux spray machine according to an embodiment of the present disclosure.

As shown in FIGS. 7 through 9, the width-adjusting mechanism 2 comprises a top frame, which can be a rectangle form or a square form formed by a left top beam 23, a right top beam 22, the back top beam 24 and the front top beam 21, wherein a top frame crossbar 20 is provided between the back top beam 24 and the front top bean 21. An outer side surface of the front top beam 21 is provided with a servomotor 26, which drives the active beam 11 through a driving belt 27, to change the width of the tracks.

To be more specific, the servomotor 26 directly drives a screw rod of a screw nut-and-rod driving mechanism 29 through the driving belt 27. One end of the screw rod is in connection with the driving belt 27, which drives the screw rod to rotate through the servomotor 26, thereby changing a relative position of the screw nut on the screw rod in the screw nut-and-rod driving mechanism 29. As shown in FIGS. 7 and 9, the screw nut is in connection with a top surface of the active beam 11 through a central connecting component 28, thereby driving the active beam 11 to slide to increase or decrease the pitch of the tracks.

Figure 6:
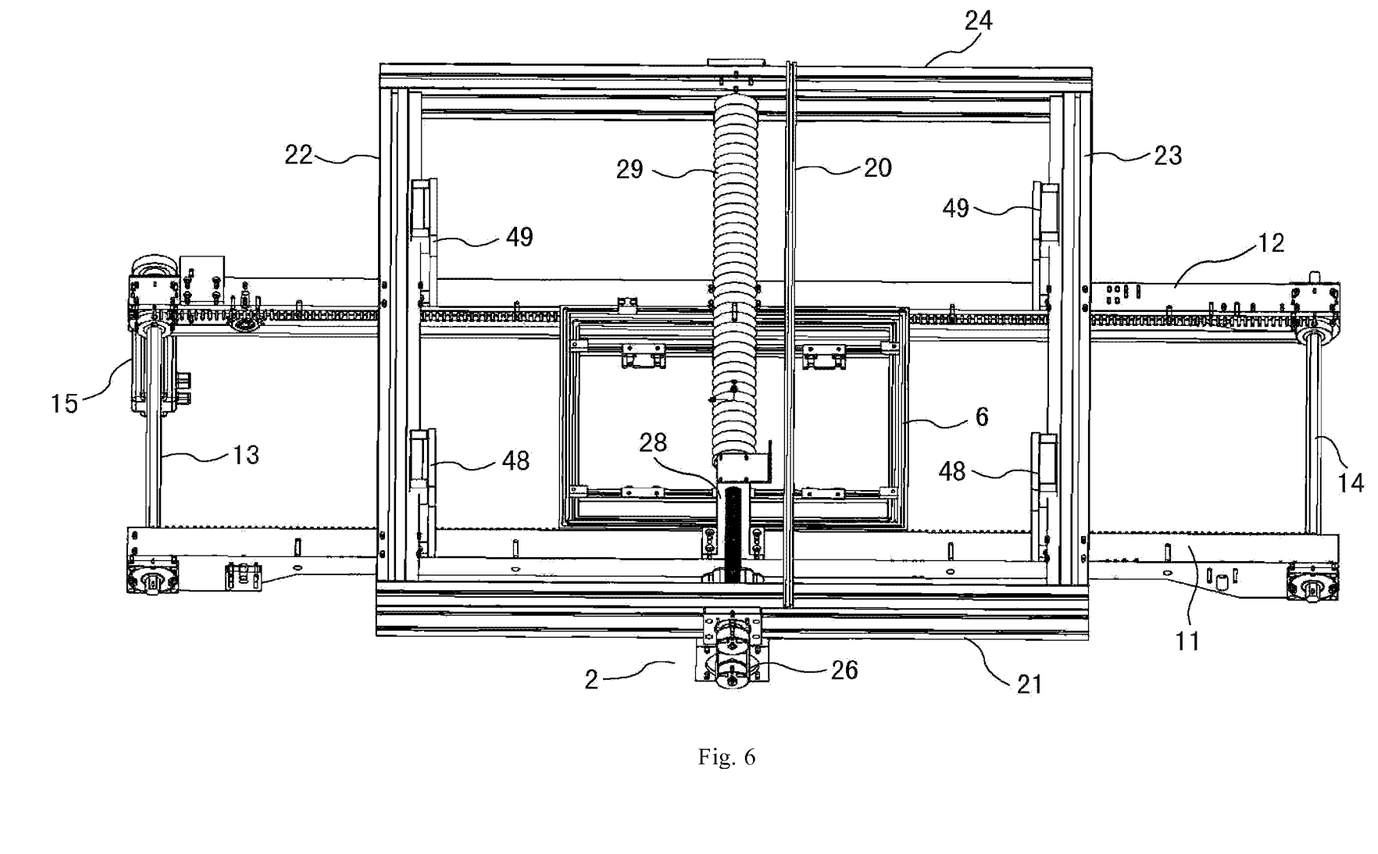
FIG. 6 is a schematic perspective view of a flux spray machine without a spray mechanism according to an embodiment of the present disclosure.

As shown in FIGS. 6 and 9, to enhance the stability of the entire flux spray machine, sliding components 48 are provided between the active beam 11 and the left top beam 23 as well as between the active beam 11 and the right top beam 22. Top ends of the sliding components 48 are lapped over step portions at opposite inner sides of the left top beam 23 and the right top beam 22, and bottom ends of the sliding components 48 are fixed to top surfaces of the active beam 11. When the active beam 11 is moving, the sliding component 48 may slide relative to the step portions of the left top beam 23 and the right top beam 22.

Fixing components 49 are provided between the fixed beam 12 and the left top beam 23 as well as between the fixed beam 12 and the right top beam 22. Top ends of the fixing components 49 are fixed to opposite inner sides of the left top beam 23 and the right top beam 22, and bottom ends of the fixing components 49 are fixed to a top surface of the fixed beam 12.

In this embodiment, the width-adjusting mechanism 2 is disposed over the PCBA transfer track 1, and the spray mechanism 7 is provided below the PCBA transfer track 1, but the present invention is not limited thereto.

4. Flow-Controlling Mechanism

As shown in FIG. 3, the flow-controlling mechanism of the present embodiment comprises four sensors/stoppers sequentially arranged at the fixed beam 12, that is, a limit sensor 31, an origin sensor 32, an origin sensor 33 and a limit sensor 34.

The origin sensors 32 and 33 are used to detect whether the PCBA 9 reaches a location where the flux nozzle 79 may start to operate. The detection can be compensated for correction through software.

The limit sensors 31 and 34 are used to detect whether the position of the next PCBA 9 or the next carrying frame 6 is beyond the set position.

When the flow of the flux spray machine is from left to right as shown in FIG. 3, the limit sensor 31 and the origin sensor 33 will effectively perform the functions of sensing and locating the PCBA, and the position of origin sensor 33 is defined as the origin (starting position) of the left-to-right flow.

When the flow of the flux spray machine is from right to left as shown in FIG. 3, the limit sensor 34 and the origin sensor 32 will effectively perform the functions of sensing and locating the PCBA, and the position of origin sensor 32 is defined as the origin (starting position) of the right-to-left flow.

When the PCBA 9 is carried by the carrying frame 6, the spray starting position of the PCBA 9 is different from the flow origin. Due to the area of the PCBA 9 being less than that of the carrying frame 6, the spray starting position of the spray mechanism must be corrected through software compensation. As shown in FIG. 3, the spray starting position of the PCBA 9 (or referred to as the origin of the nozzle) may be set to the lower right of the PCBA 9.

An effective movement range of the spray mechanism 7 must be larger than the maximum size (480 mm*360 mm) of the PCBA 9 from the spray starting position of the flux nozzle 79.

When the flow is changed, there is a difference of 180 degrees from the X-axis (direction of the crossbeam 73) origin of the original flow, corresponding to the spray starting position of the flux nozzle 79.

5. Angle-Adjusting Mechanism 4

As shown in FIG. 3, the angle-adjusting mechanism 4 is provided below the top frame and comprises two sets of adjusting component, i.e., a left lifting column 41 and a right lifting column 42, which are used to adjust a left height and a right height of the PCBA transfer tracks 1 respectively. When the left height is different from the right height, a certain angle is formed between the PCBA transfer track 1 and the horizontal plane, which can be adjusted in a range of 0~10 degrees according to the practical requirement. The left lifting column 41 and the right lifting column 42 are two independent adjusting mechanisms.

Figure 10:
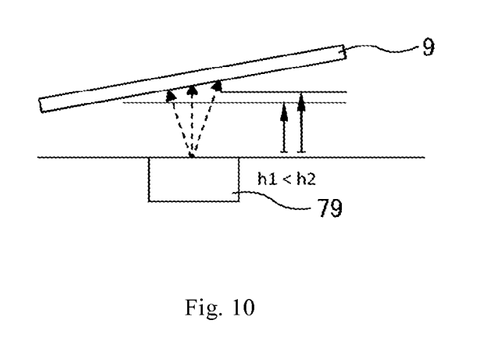
FIGS. 10 and 11 show different spray angles of the flux spray machine for comparison.

The angle adjustment is based on the following reasons. When the PCBA 9 is not perpendicular to the flux nozzle 79, the process of spraying the flux will make the pressure acting on the PCBA 9 nonuniform and will produce a shadowing effect, thereby resulting in the nonuniform spray. As shown in FIG. 10, in the case of same spray pressure, the distance between the flux nozzle 79 and the PCBA 9 changes with the movement of the flux nozzle 79. For example, referring to FIG. 10, h1 is less than h2, and thus the spray pressure at a position of the PCBA 9 corresponding to h1 is larger than that corresponding to h2.

Figure 11:
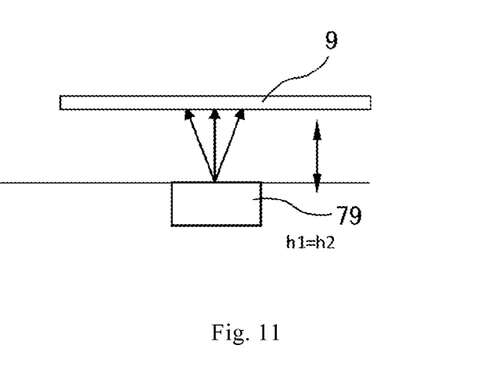

However, when the PCBA 9 is perpendicular to the flux nozzle 79, the distance between the flux nozzle 79 and the PCBA 9 keeps constant with the movement of the flux nozzle 79. For example, referring to FIG. 11, h1 is equal to h2, and thus the spray pressures at positions of the PCBA 9 corresponding to h1 and h2 are equal to each other. Therefore, the nonuniform spray of the flux caused by the nonuniform spray pressure can be improved, and the penetrability of the flux in the through hole will be improved, as shown in FIG. 11.

Thus, when the PCBA 9 is perpendicular to the flux nozzle 79, the shadowing effect can be reduced and the quality of the flux spray can be improved.

Furthermore, when there is a height difference between opposite ends of the PCBA transfer track due to the connection with the upstream and downstream equipments, a change of the angle between the PCBA 9 and the flux nozzle 79 will occur if there is no linkage between the spray mechanism 7 and the PCBA transfer track 1.

In order to adapt to the connection with the upstream and downstream equipments, the perpendicular state between the PCBA 9 and the flux nozzle 79 is kept by adjusting the angle in left-right direction of the PCBA transfer track 1 through the angle-adjusting mechanism 4, and by the linkage between the PCBA transfer track 1 and the spray mechanism 7.

The left lifting column 41 and the right lifting column 42 have the same structures and are symmetrically arranged, and thus the right lifting column 42 will be described as an example. Two right lifting columns 42 are provided below a junction between the back top beam 24 and the right top beam 22 and below a junction between the front top beam 21 and the right top beam 22, respectively. As shown in FIGS. 8 and 12, the right lifting column 42 below a right end of the back top beam 24 comprises a wedge-shaped base 43, a connecting component 44 and a driving component 45. A lifting mechanism, for example a thread-engaged lifting mechanism, is provided inside the wedge-shaped base 43.

The driving component 45 such as a hand wheel or a motor is used to provide a driving force to the lifting mechanism. A lower end of the connecting component 44 is sleeved on a top end of an output screw rod of the lifting mechanism, and an upper end of the connecting component 44 is hinged to a lug disposed on a lower surface at a right end of the back top beam 24. When the right lifting column 42 is lifting, the perpendicular state of the connecting component 44 and the right top beam is changed to a non-perpendicular state.

Two right lifting columns 42 are required to lift synchronously. The bottom of the output screw rod of each right lifting column 42 is sleeved on a gear, and the two gears of two right lifting columns 42 are connected with a timing chain 46 to ensure the synchronization between two right lifting columns 42.

In the operation of the left lifting column 41 and the right lifting column 42, the back top beam 24 and the front top beam 21 on the top are driven first. The left top beam 23 and the right top beam 22 are also lifted due to the integral structure of the top frame. The fixing component 49, the sliding component 48 and the central connecting component 28 in connection with the top frame drive the PCBA transfer track 1 to lift, thereby achieving the angle adjustment. The state after lifting the right end of the PCBA transfer track 1 is shown in FIG. 12.

As the connecting plate 8 is in fixed and connected between the top frame and the spray mechanism 7, when the height (angle) of the PCBA transfer track 1 is adjusted through the left lifting column 41 and the right lifting column 42, there is a linkage between the spray mechanism 7 and the PCBA transfer track 1, i.e., the spray mechanism 7 presents a same inclination angle corresponding to and the angle of the PCBA transfer track 1. Thus, while the PCBA 9 is transferred by PCBA transfer track 1, the flux nozzle 79 is kept in the perpendicular state, i.e., is kept to spray perpendicularly.

The PCBA transfer track 1 may lift through both the left lifting column 41 and the right lifting column 42. When the lifting height of the left lifting column 41 is equal to that of the right lifting column 42, the lifted PCBA transfer track 1 is parallel to the horizontal plane, and the spray mechanism 7 is driven to keep parallel to the horizontal plane.

According to exemplary embodiments, the top frame is fixed and connected to the primary longitudinal beam 72 and the secondary longitudinal beam 71 of the spray mechanism 7 through the connecting plate 8, as a result, the plane of the top frame is kept relatively parallel to the plane of the primary longitudinal beam 72 and the secondary longitudinal beam 71 of the spray mechanism 7. In addition, the PCBA transfer track 1 is fixed and connected to the top frame through the fixing component 49, the sliding component 48 and the central connecting component 28. Thus, the plane of the top frame can be kept relatively parallel to the plane of the PCBA transfer track 1. As a result, the transfer plane of the PCBA transfer track 1 (the plane of the transferred PCBA 9) keeps relatively parallel to the spray plane of the spray mechanism 7 (the plane of various positions of the flux nozzle 79), such that the PCBA 9 keeps relatively perpendicular to the flux nozzle 79, thereby avoiding the negative effect of the shadowing effect, effectively overcoming the non-uniformity of the flux spray, and improving the quality of solder.

The beneficial effects of one or more embodiments of the present invention are described as followings.

The present flux spray machine breaks through the limitation of the conventional mechanical structure, and thus the entire mechanical structure supports two-way flow (left-to-right or right-to-left). After the equipment is purchased, the flow may be set by oneself according to the site requirement and the track width may be adjusted corresponding to the size of the PCBA.

Furthermore, as to the mechanical structure, each flow is set with a mechanical origin in consideration of the convenience for varying the flow and the repeating accuracy, thereby the simplicity and fool proof requirement is met and the faulty operation of the operator by mistake is avoided. The repeating accuracy of the operation is accurately improved through the compensation correction of the mechanical origin and the software origin.

The purchased flux spray machine may be set by oneself with the flow according to any flow requirement of the production line, thereby the application flexibility of the equipment is greatly improved and the purchasing cost of the equipment is reduced. It is avoided that the equipment is idle and wasted due to unchangeable flow of the conventional flux spray machine.

The single-direction movement of the nozzle is replaced with the X-Y table spray structure, thereby the spray structure is flexible to meet various spray requirements and the stable spray quality is achieved.

Furthermore, in the present flux spray machine, the nozzle thereof is synchronously adjusted along with the angle of the PCBA transfer track to keep the nozzle perpendicular to PCBA, thereby the adverse effect from the shadowing effect is avoided and the solder quality is improved.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will comprise all embodiments falling within the scope of the appended claims.

What is claimed is:

1. A flux spray machine for spraying flux to printed circuit board assembly (PCBA), comprising:
    a PCBA transfer track to transfer the PCBA configured to have flux applied thereon, comprising an active beam and a fixed beam;
    a spray mechanism comprising a X-Y table, wherein the X-Y table of the spray mechanism comprises a longitudinal beam and a crossbeam configured to move on the longitudinal beam and perpendicular to the longitudinal beam, and a flux nozzle for spraying flux is disposed on the crossbeam and configured to move on the crossbeam;
    a flow-controlling mechanism, comprising origin sensors and limit sensors for two different flows in two longitudinal directions of the PCBA transfer track;
    a width-adjusting mechanism for adjusting a distance between the active beam and the fixed beam, the width-adjusting mechanism comprising a top frame disposed over the PCBA transfer track, a driving mechanism provided at a center of the top frame, a connecting component connected between the PCBA transfer track and the driving mechanism, and a third servomotor for driving the driving mechanism to move the active beam close to or away from the fixed beam; and
    an angle-adjusting mechanism for adjusting an angle between the PCBA transfer track and a horizontal plane, the angle-adjusting mechanism comprising two pairs of synchronizing lifting columns provided below four corners of the top frame respectively;
    wherein the lifting column comprises a wedge-shaped base, a lifting mechanism provided in the wedge-shaped base, a connecting plate connected to an output screw rod of the lifting mechanism, and a driving component for driving the lifting mechanism,
    wherein an upper end of the connecting plate is hinged to the top frame,
    wherein two output screw rods of a pair of synchronizing lifting columns are provided with synchronizing gears, and a timing chain is connected between the gears.

2. The flux spray machine as claimed in claim 1, wherein a fixing component is further fixed and connected between the fixed beam and the top frame.

3. The flux spray machine as claimed in claim 2, wherein the top frame is of a rectangle shape formed by a back top beam, a front top beam, a left top beam and a right top beam, two sliding components and two fixing components are connected with the left top beam and the right top beam in left-to-right symmetry.

4. The flux spray machine as claimed in claim 1, wherein the driving component is disposed at a side close to the fixed beam and away from the active beam.

* * * * *